United States Patent [19]

Kron et al.

[11] 4,283,177

[45] Aug. 11, 1981

[54] VISION LOSS SIMULATOR

[75] Inventors: Gerald J. Kron, Binghamton; Timothy E. Hale, Vestal, both of N.Y.

[73] Assignee: The Singer Company, Binghamton, N.Y.

[21] Appl. No.: 17,645

[22] Filed: Mar. 5, 1979

[51] Int. Cl.³ .............................................. G09B 9/08
[52] U.S. Cl. ...................................... 434/59; 350/333
[58] Field of Search ................... 35/12 N, 12 G, 12 B, 35/17; 350/330, 331, 333, 336; 351/7

[56] References Cited

U.S. PATENT DOCUMENTS

| | | | |
|---|---|---|---|
| 3,675,988 | 7/1972 | Soref | 350/336 |
| 3,942,270 | 3/1976 | Hoyt et al. | 35/12 N |
| 4,050,814 | 9/1977 | McFadden | 350/331 R X |
| 4,102,564 | 7/1978 | Michael | 351/7 |
| 4,106,217 | 8/1978 | Witt | 35/12 G X |
| 4,109,145 | 8/1978 | Graf | 250/201 |

OTHER PUBLICATIONS

"Optical Journal & Review of Optometry" vol. 102, No. 9, p. 31, May 1, 1965.

Primary Examiner—William H. Grieb
Attorney, Agent, or Firm—Stephen C. Kaufman; J. Dennis Moore; Jeff Rothenberg

[57] ABSTRACT

An apparatus and method for simulating the loss of vision in a subject, which occurs for example under sustained high "G" loading, using an optical element 12 such as a visor with variable optical characteristics ranging from opaque to transparent. An oculometer 18 monitors at least one of the subject's eyes and provides a signal representative of its line of sight. This signal is fed to a computer 56 which calculates a pattern of opacity, light scattering transmissivity and transparency and controls the screen accordingly to produce such a pattern simulative of the visual effects which occur during loss of vision.

28 Claims, 5 Drawing Figures

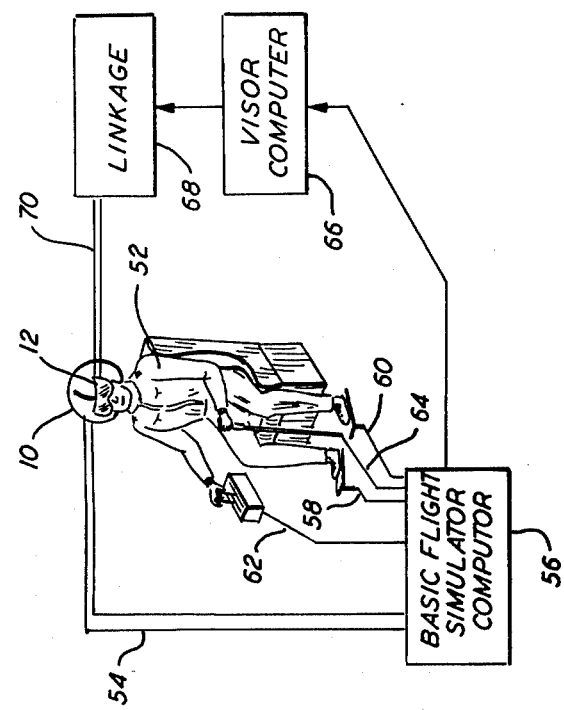
FIG. 4
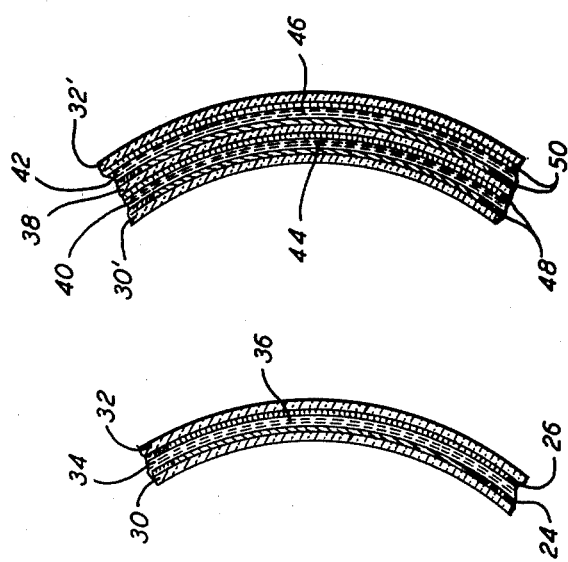
FIG. 3
FIG. 2

VISION LOSS SIMULATOR

BACKGROUND OF THE INVENTION

1. Field of the Invention

The present invention relates to the art of simulation and more particularly relates to devices which simulate vision loss which, for example, occurs when a subject is subjected to sustained large acceleration forces.

2. Brief Description of Prior Art

When a subject experiences a large drop in blood pressure in his head, particularly at the temporal level, a gradual loss of vision usually follows. For example, during maneuvers pilots of tactical aircraft are subjected frequently to high G-loading which causes such a blood pressure drop. At sufficient magnitudes of upward acceleration, e.g., during a pull-out from a dive, a pilot's vision will gradually fade and actually disappear before the pilot passes out. Such complete vision loss, even though consciousness persists, is often referred to as "black out".

Under G-loading, vision loss proceeds according to a schedule which follows a fairly well defined pattern, although there are differences in the subjective visual perceptions reported by subjects. The fading begins as a gradual loss of contrast throughout the subject's field of view. At sufficiently high G's, a more severe peripheral fading, or dimming, begins at the edges of the subject's field of view and proceeds inwardly toward the center. Subjects report that this is like looking through a tunnel of diminishing diameter, hence the term "tunnel vision" is used to describe the perception.

The dimming occurs as an increasing loss of contrast caused by a gradual increase in the threshold of perception. First, faint lights are lost from view in the dimming area, and then gradually brighter and brighter lights disappear in the effected area until vision is lost completely. The onset effects have been reported as a perception of "graying" of the field of view.

In addition, subjects have reported a "misting" or "veiling" effect at the edges of the advancing area of fading, as if that portion was being viewed through a veil. Some subjects have reported that this effect, as well as the greying effect, advances from the periphery first in "spikes" or "filaments" followed by a more uniform area of affectation.

It is believed that the reason the dimming proceeds in the pattern just described is that the drop of pressure causes blood to drain from the retinal arteries in a sequence starting first with capillaries and proceeding to larger and larger arterial branches toward trunk arteries which eminate from the center of the rear of the eye. This decrease in blood supply occasions oxygen starvation which causes vision loss. Hence the filament-like advancement of the effects from the periphery toward the center.

Another visual disturbance, associated with fore and aft accelerations of a subject, is a reported blurring of vision. Photographic studies of an eyeball under high decelleration show that a film of lacrimal fluid issues from the lacrimal glands and collects on the cornea under such conditions. It is suspected that this causes the reported blurring.

Also experienced, under extreme downward acceleration, is a phenomenon known as "red-out" among pilots. It is experienced as the perception of a red screen which advances from the bottom of the subject's field of view. During such accelerations the entire cranial area becomes engorged with blood, including the area around the lower eyelid. It is believed that the lower eyelid swells and is forced upward to infringe on the area of the pupil. Thus the occurrence of "red out".

Experienced pilots utilize these cues in the operation of aircraft. In particular, pilots learn to judge how close to black-out they are by the extent to which the peripheral onset effects have advanced. This is of particular importance to pilots in conditions where visual contact of an adversary must be maintained.

It is thus desirable in the simulation art to give the pilot the advantage of experiencing these important cues while piloting a simulator, in order to train the pilot in their utilization. To this end, Carl E. Hoyt and Timothy E. Hale invented a device and method for simulating visual black-out, disclosed in U.S. Pat. No. 3,942,270 which issued Mar. 9, 1976. In one embodiment of that invention, a special visor having a non-uniform layer of liquid crystal provides a variable opacity screen. The liquid crystal is sandwiched between a pair of curved, planar transparent electrodes which define a container for the liquid crystal. This container is likewise of curved, planar configuration, but has a thickness which smoothly varies from a relatively thin center point to a thicker periphery. Exciting the liquid crystal with a voltage causes the crystal to turn opaque. However, the voltage level at which the opacity is produced varies according to the thickness of the layer. Thus, in the configuration just described, as the voltage is increased opacity advances from the periphery of the visor to the center point. In this manner the advancing fading of onset blackout visual effects may be simulated.

In another embodiment, a liquid crystal visor is provided with a row of electrodes in the form of horizontal strips opposite a planar electrode of opposite polarity. The strip electrodes are sequentially excited from, e.g., bottom to top to produce an effect which advances upwardly. Such a device can be used with polarizing liquid crystals in conjunction with polarized red light to produce a red screen which advances upwardly to simulate "red-out".

The invention disclosed in U.S. Pat. No. 3,942,270 represents an important advance in the art of simulation. However, it suffers several significant shortcomings. Probably the most serious is the fact that the simulated effects are produced relative to a fixed, central, single "line of sight". Thus, while that line moves as the subject moves his head, it does not move as the subject moves his eyes, as do the actual effects. This detracts from the realism of the device.

Further, limited flexibility is offered in the configuration of the screening effect produced. Indeed, the preferred embodiment contemplates simply a transparent circular central area bounded by an area of opacity. There is, for example, no provision for (nor mention of) the filamenting effects noted earlier.

The present invention provides a vision loss simulator which successfully overcomes these shortcomings and provides greatly expanded flexibility in producing the visual effects associated with the onset of blackout. In fact, the present invention is capable of being used as a research tool, for example to explore empirically which are the most significant cues which pilots rely on in the operation of their craft.

SUMMARY OF THE INVENTION

Accordingly, a primary object of the present invention is to provide a device which simulates the loss of vision which accompanies a drop in blood pressure in a subject's head, for example, due to sustained large acceleration forces.

It is a further object of the present invention to simulate vision loss by providing a controllable element in a subject's field of view, which is capable of affecting the subject's peripheral field of view by interposing optical effects in the element which move with the subject's line of sight.

A still further object is to simulate vision loss in a subject by controllably introducing simulated veiling, or misting, and greying in varying amounts in his field of view.

These and other objects are accomplished by providing an optical element within the field of view of a subject, which has a range of variable optical transmission characteristics. A predetermined dynamic pattern of such variable transmission characteristics is generated in the optical element relative to a reference point and in a configuration which simulates vision loss. An eye line of sight monitor provides a signal representative of the subject's line of sight. This signal is used to control the pattern reference point to make it move with the subject's eyes so that any given predetermined pattern will appear stationary with respect to the subject's field of view.

In this manner blackout onset effects and other visual effects which accompany the experience of high acceleration forces, may be simulated to a very high degree of realism. The great flexibility provided in pattern and schedule selection allows reproduction of such effects to an accuracy limited primarily by the resolution of the optical element and the range of optical transmission characteristics which it is capable of providing. In the preferred embodiment, for example, the range of optical characteristics which can be produced includes light scattering transmissivity as well as transparency and opacity. Further, unlike prior approaches, by moving the pattern reference point so that it follows the line of sight of the subject, the effects remain stationary with respect to the subject's field of view as is the case with the actual affects being simulated.

BRIEF DESCRIPTION OF THE DRAWINGS

The foregoing and other objects and advantages of the present invention will become apparent upon reading the following detailed description and upon reference to the drawings in which:

FIG. 2 is a cross section of the helmet visor of FIG. 1;

FIG. 3 is a cross sectional view of an alternative embodiment of the visor of FIG. 1; while FIG. 4 is a schematic diagram illustrating the connections which are made when the modified helmet of FIG. 1 is used in connection with a flight simulator.

DETAILED DESCRIPTION OF THE PREFERRED EMBODIMENT

It is clear from the foregoing discussion that the present invention is amenable to numerous applications in the simulation art. For example, the invention could conceivably be used as an educational device in medical training to illustrate the visual effects that accompany incipient fainting. However, the most important use of which the present inventor is aware is in the area of flight simulation of tactical aircraft in which pilots perform maneuvers which would subject them to high "G" conditions for sustained periods in the actual aircraft. Accordingly, the preferred embodiment described herein will be considered in that context.

Figure 1:
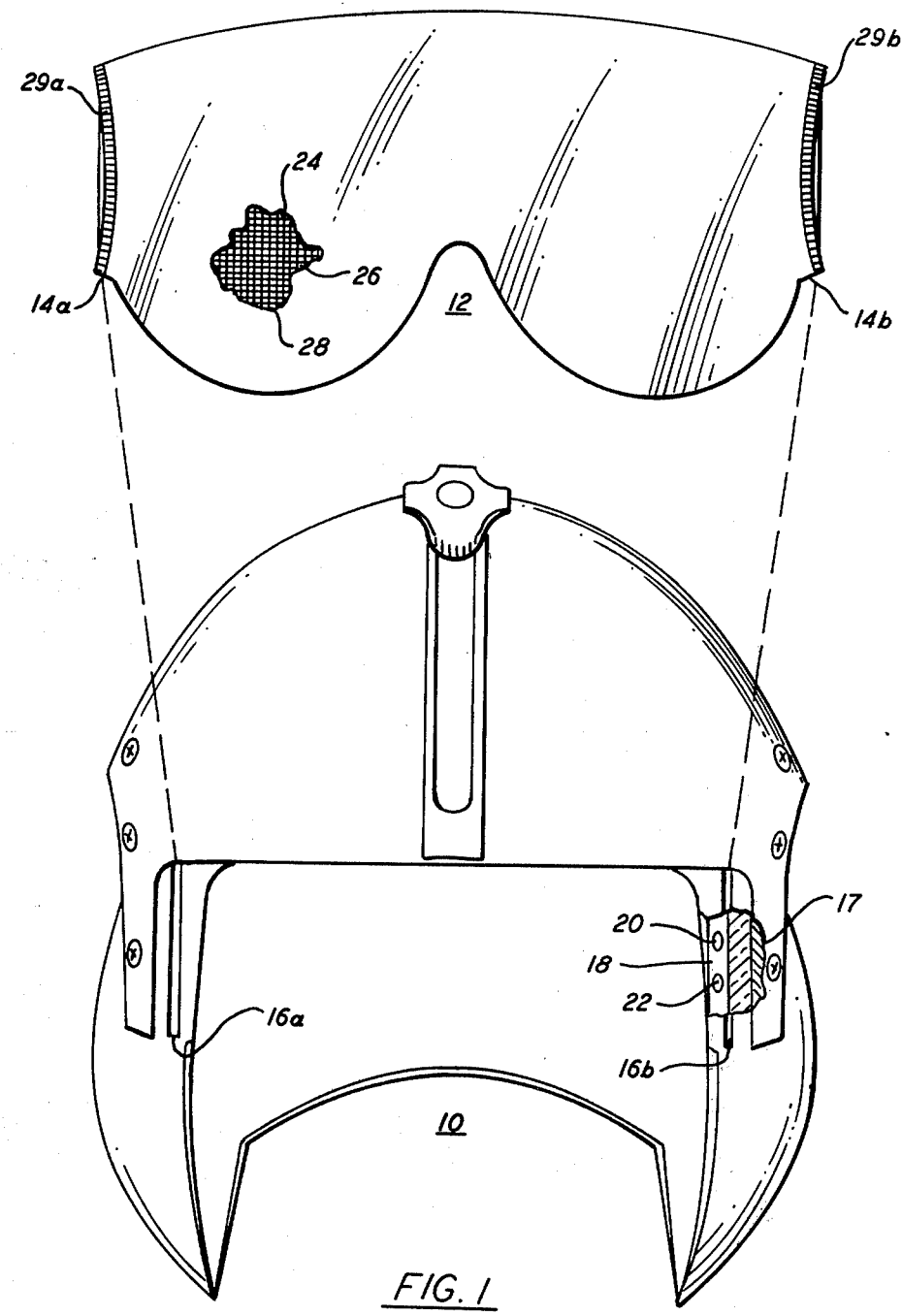
FIG. 1 is a partially exploded view of a standard pilot's helmet modified in accordance with the present invention.

Referring now to the drawings, FIG. 1 is a partially exploded view of a modified tactical aircraft pilot's helmet 10 and its associated modified visor 12, removed for purposes of clarity. As can be seen, visor 12 is provided with visor-guides 14a and 14b which fit into visor cover tracks 16a and 16b in helmet 10. Helmet 10 has been modified by having two oculometers mounted one each near the left and right visor cover tracks 16. One oculometer, 18, can be seen in partial cut-out 17 of helmet 10. Oculometer 18 provides an output signal representative of the line of sight of the left eye by monitoring a beam of electro-magnetic radiation, such as light, which is reflected off of that eye, in a manner well known in the art. Light transmitter 20 and receiver 22 of oculometer 18 can be seen in FIG. 1. The other oculometer (not shown) likewise provides a line of sight signal for the right eye. A simpler embodiment employs only one oculometer and operates on the assumption that both eyes track together.

Visor 12 is modified so as to contain one or more layers of optical material, such as liquid or suspended crystal, between a pair of rows of transparent electrodes. A row of vertically aligned electrodes 24, and a row of horizontally aligned electrodes 26 disposed opposite thereto, can be seen through partial cut-away 28 of visor 12. Electrical contacts 29a, 29b which are wired to electrodes 24, 26, plug into sockets (not shown) in helmet 10 which is wired to a computer, as will be more fully explained below.

Reference should now be made to FIG. 2 for a better understanding of the configuration of visor 12. FIG. 2 shows visor 12 in partial cross section. The "sandwich" construction is readily apparent from the drawing. Two curved, transparent retaining plates 30 and 32 define a curved planar cavity 34 which contains a layer of optical material 36. Vertical electrodes 24 are made of a suitable transparent conductive material, such as tin oxide, and are coated onto the inner surface of one of the retaining plates, such as inner plate 30. Transparent horizontal electrodes 26 are likewise coated onto the inner surface of the opposite plate, herein plate 32.

Together electrodes 24 and 26 define a grid-like configuration most readily apparent in FIG. 1. The points where electrodes 24, 26 cross, in FIG. 1, are the points at which the electrodes are most proximate, and will therefore be the points at which the optical material will be excited when a voltage is applied between the electrodes. In this way, the layer of optical material is addressable at any point therein by the application of a voltage between the appropriate two electrodes from rows 24 and 26.

In practice, the entire grid is scanned sequentially in a process called "multiplexing". In this process a voltage is applied to a row of electrodes, one at a time. During the time the voltage is applied to any one of those electrodes, another voltage, opposite in polarity, is applied to the orthogonal row of electrodes, one or more at a time.

Due to the fact that the optical effects which can be induced in optical materials such as liquid crystals persist for a finite time, broad areas can thus be excited and sustained by selecting the appropriate scan rate.

The particular configuration of electrodes selected, while not arbitrary is nonetheless the subject of considerable latitude. The linear orthogonal grid chosen for the preferred embodiment described herein was considered most logical as it provides an addressable rectangular coordinate system within the visor. This system greatly simplifies the computations necessary to generate the scanning sequence.

FIG. 3 shows a cross sectional view of an alternative embodiment of the visor of the present invention which utilizes two layers of optical material that are independently addressable. In this embodiment inner and outer retaining plates, 30' and 32' respectively, are supplemented with a third, middle retaining plate 38. Together these plates define inner and outer containers 40, 42 in which two different types of optical materials 44 and 46 are contained. For example, a light scattering mode liquid crystal such as a twisted nematic type could be 44, and 46 could be an opaque mode liquid suspension of transparent electrodichroic crystals. (For economy of words, the phrase "liquid crystal" when hereinafter used will be understood to include both liquid crystal materials and suspended crystal materials.) Separate transparent orthogonal grid electrode systems 48, 50 are provided for each layer of material. Thus separate, even overlapping configurations of different electro-optical effects can be superimposed to make a multimode composite image.

The preferred embodiment contemplates a similar multimode composite image generation. However, the preferred embodiment contemplates the use of a single liquid crystal in which two types of molecules, each of which exhibits a different mode of optical characteristic when excited, are chemically bonded together. Each retains its separate threshold excitation voltage, and the liquid crystal is thus trimodel in operation, including transparent. To excite a particular mode, the appropriate voltage is simply applied.

In operation, the modified helmet/visor system described above is used in conjunction with a flight simulator. FIG. 4 illustrates the connections in such a system. The pilot 52 wears modified helmet 10 which has modified visor 12 in place. The oculometer output 54 is fed to a basic flight simulator computer 56.

Computer 56 also receives signals representative of various parameters controllable by the pilot which affect the flight configuration of the aircraft, such as rudder pedal position 58, 60, throttle setting 62, and control stick position 64. These signals are used by the computer to calculate, in a manner well known in the art, the various flight parameters of the aircraft being simulated, including speed, acceleration, orientation and the like. The calculated acceleration forces, and their rate of change, are utilized in another series of calculations which implement a mathematical model of the human visual response to acceleration forces. The results of these calculations are used to construct an instantaneous pattern for the visor which will produce visual impairments simulative of the visual effects which would accompany the calculated acceleration profile.

The pattern information is fed to visor computer 66 which computes, in a manner well known in the art, a scanning sequence which implements the patterns. This sequence is fed to a linkage 68 which converts the digital scanning information to the actual analog scanning signals which control the operation of visor 12 through line 70.

A mathematical model suitable for use with the present invention has been developed and is presented in computer program flow chart form in the Appendix. This simplified program not only interfaces with the visor described above, but also with ambient illumination controls, for example cockpit indicator light sources. This provides more complete control of the perceived contrast range in the subject's field of view, and creates a more realistic effect.

The model implements overall contrast loss, by commanding diffuse light scattering, in a linear fashion between 1.85 g's and $G_{CRIT}$, wherein $G_{CRIT}$ equals that level $G_Z$, or upward acceleration, above which peripheral light loss will eventually ensue. Operation above $G_{CRIT}$ triggers the sequential collapse of two "terminators", or circular boundaries, toward the center of the visual binocular field of view. The rate of collapse is a function of the $G_Z$ onset rate below $G_{CRIT}$ and the $G_Z$ margin above $G_{CRIT}$.

The inner terminator, denominated the "disturbance terminator", defines, at any instant in time, an included circular area in which no visual disruption occurs due to $G_Z$ levels above the $G_{CRIT}$ value. The outer terminator, denominated the "blackness terminator", describes an external area in which total light suppresion is scheduled. Progressive contrast reduction, by the implementation of the light scattering mode, and subsequent illumination reduction, by the implementation of the opaque mode, occur radially within the annular area between terminators, called the "grey-out" area.

The terminators are both stored outside the binocular field of view during one G conditions. The terminators are held there until the $G_Z$ level surpasses the current value of $G_{CRIT}$, at which time the terminators are permitted to collapse inward. The collapse carries the blackness terminator to a position defined for complete peripheral light loss, set herein at 8° from the center of the instantaneous line of sight. The disturbance terminator and grey-out area precede the blackness terminator into the shrinking field of view and hold at that defined peripheral light loss position while the blackness terminator "catches up", causing the grey-out band to disappear, replaced by total light suppression. Once the blackness terminator reaches the peripheral light loss position, a new rate of closure is computed causing the remaining central field of view to collapse to total blackout over two seconds. The disturbance terminator and grey-out band do not precede the blackness terminator in the central light loss phase.

The model will cause total light loss to remain until the $G_Z$ level is either lowered to the $G_{CRIT}$ level or conversely the $G_{CRIT}$ level is raised, by the pilot's executing the M1 grunting maneuver, above the current $G_Z$ level. Both terminators rapidly expand outwards under these conditions; however, the disturbance terminator delays long enough to reestablish the grey-out band. Terminator direction reversal can occur at any point in the collapse or expansion sweep; consequently, a subject, by carefully controlling his G level and M1 execution, should be able to exercise some control over the penetration of the grey-out band into his field of view, which is the case in actual flight conditions.

Light scattering is also scheduled in response to calculated fore and aft (x-axis) accelerations, at the end of the program.

This model provides a fairly good approximation of the effects reported by researchers in the field. The program may be modified at the will of the designer to implement further refinements in the mathematical model, and to recreate, for example, the filament-like effects described above. Indeed, by modifying the program the invention can be used as an experimental tool to determine empirically which schedule of visual effects most realistically simulates the G-induced acceleration effects experienced by subjects.

Figure 5:
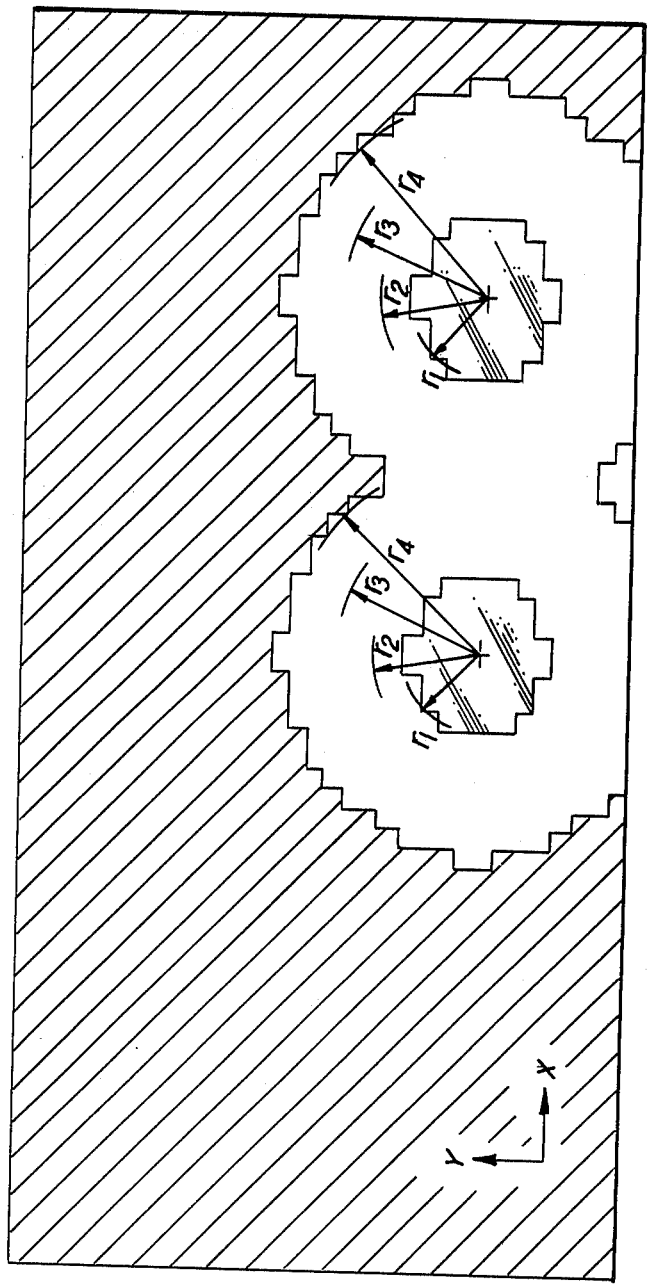
FIG. 5 is a diagrammatic representation of a pattern which is produced on the visor of FIG. 1 during its operation to simulate vision loss.

Reference should now be had to FIG. 5 wherein is depicted a visor pattern which may be implemented mathematically by augmenting the outputs of the above program using techniques well known in the computer art. Instead of referencing relative to a single central point corresponding to the center of the visual binocular field of view, as is done in the simplified model described above, two separate patterns are generated each referenced to the line of sight of one eye. While in the previous model the field of view seems to collapse to a point between the subject's eyes, this model implements a visual pattern which more realistically collapses about the center of the subject's perceived field of view, as the subject's brain merges the two superimposed images.

In this pattern $r_4$ denotes the radius of the blackness terminator, and $r_1$ denotes the radius of the disturbance terminator. Between them, in the grey-out area, two additional radii $r_2$ and $r_3$ are defined. Between $r_1$ and $r_2$ light scattering transmissivity is scheduled to be induced at widely scattered points, while between $r_2$ and $r_4$ light scattering transmissivity is induced uniformly throughout. Between $r_3$ and $r_4$ opacity is scheduled to be induced at widely scattered points, while beyond $r_4$ opacity is induced uniformly throughout. This stepped schedule more accurately simulates the actual experience of the effects gradually fading in from the periphery. Note that to insure the proper sequencing, where a conflict exists between a band of one eye and a band of the other, the characteristics of the band defined by the lower numbered radius prevails.

It should be evident from the foregoing description that the considerable flexibility provided by the present invention greatly expands the frontiers of high acceleration visual loss simulation.

While there have been described what is at present considered to be preferred embodiments of this invention, it will be obvious to those skilled in the art that various changes and modifications may be made therein without departing from the invention, and it is therefore intended to cover herein all such changes and modifications as fall within the true spirit and scope of the invention.

We claim:

1. Apparatus for simulating vision loss in a subject, comprising:
   (a) an optical element for use within the field of view of the subject which has a range of variable optical transmission characteristics;
   (b) first means for varying at selectable locations the optical transmission characteristics of said optical element; and
   (c) second means for monitoring the line of sight of an eye of the subject and providing an output signal representative of said line of sight; and
   (d) control means responsive to said second means for controlling according to a predetermined schedule said first means to produce a dynamic pattern of said optical transmission characteristics in said optical element by the application of a control parameter at selected locations therein, said pattern being defined with respect to the instantaneous line of sight of at least one eye of the subject, whereby the visual effects associated with vision loss are simulated for the subject.

2. The apparatus of claim 1 wherein said optical element comprises a layer of optical medium contained between a first and a second transparent layer, and variable in response to said applied parameter through said range.

3. The apparatus of claim 2 wherein said layer of optical medium comprises a layer of liquid crystal.

4. The apparatus of claim 2 wherein said first means comprises:
   (a) a first row of linear elements associated with said control means and positioned adjacent said first transparent layer; and
   (b) a second row of linear elements associated with said control means and positioned orthogonally to said first row of linear elements and adjacent said second transparent layer, whereby said layer of optical medium may be altered in its optical transmission characteristics at any one or more of an array of locations where one element of said first row crosses one element of said second row, by the application of said control parameter between said one element of said first row and said one element of said second row.

5. The apparatus of claim 4 wherein said control means comprises multiplexing means for selectably scanning said first and said second rows with said applied control parameter, whereby each of said locations on said array may be selectively and sequentially stimulated by the application of said control parameter thereat.

6. The apparatus of claim 5 wherein said control means further comprises
   computing means responsive to the output signal of said second means for computing a scanning sequence representative of said desired pattern, whereby said computed scanning sequence controls said multiplexing means to produce in said optical element said desired pattern.

7. The apparatus of claim 6 wherein said apparatus is intended for use in conjunction with a vehicle simulator operable by the subject, which simulator provides simulator output signals representative of the vehicle acceleration forces which would be transmitted to the subject in the actual vehicle being simulated, and wherein said computing means further comprises means responsive to the simulator output signals for computing said scanning sequence such that said visual effects correspond to the visual effects the subject would perceive were he experiencing loss of vision due to the effect of the vehicle acceleration forces on him.

8. The apparatus of claim 7 wherein said optical element comprises a visor.

9. The apparatus of claim 1 wherein said dynamic pattern comprises:

(a) a first dynamic area being in a first state of transparency, said first area being defined, according to said predetermined schedule, with respect to the point of intersection of said optical element and the line of sight of an eye of the subject; and (b) a second dynamic area, bordering said first area, being in a second state of controlled variable opacity at first selected locations, said first selected locations being defined according to said predetermined schedule, whereby the field of view of the subject is alterable according to said predetermined schedule to simulate for the subject the visual effects associated with vision loss.

10. The apparatus of claim 1 wherein said dynamic pattern comprises:

(1) a first dynamic area being in a first state of transparency, said first area being defined according to said predetermined schedule with respect to the point of intersection of said optical element and the line of sight of an eye of the subject, (2) a second dynamic area bordering said first area, in which at first selected locations a third state of light scattering transmissivity has been produced, said second area and said first selected locations being defined according to said predetermined schedule;

(3) a third dynamic area, bordering said second area, in which at second selected locations a second state of opacity has been produced, said third area and said second selected locations being defined according to said predetermined schedule, whereby the field of view of the subject is alterable according to said predetermined schedule to simulate for the subject the visual effects associated with vision loss.

11. The apparatus of claim 10 wherein said optical element comprises a layer of optical medium contained between a first and a second transparent layer, and variable in response to said applied control parameter between said first, and second, and said third states.

12. The apparatus of claim 11 wherein said first means comprises:

(a) a first row of linear elements associated with said control means and positioned adjacent said first transparent layer; and (b) a second row of linear elements associated with said control means and positioned orthogonally to said first row of linear elements and adjacent said second transparent layer, whereby said layer of optical medium may be altered, between said first state, and said second state and said third state at any one or more of an array of locations where one element of said first row crosses one element of said second row, by the application of said control parameter between said one element of said first row and said one element of said second row.

13. The apparatus of claim 12 wherein said control means comprises multiplexing means for selectively scanning said first and said second rows with said applied control parameter, whereby each of said locations on the array may be selectively and sequentially stimulated by the application of said control parameter thereat.

14. The apparatus of claim 10 wherein said optical element comprises first and second generally parallel layers of optical medium, wherein:

(a) said first layer is contained between a first and a second transparent layer, and is variable in response to said applied control parameter between said first state and said second state; and (b) said second layer is contained between a third and fourth transparent layer, and is variable in response to said applied control parameter between said first state and said third state.

15. The apparatus of claim 14 wherein said first means comprises:

(a) a first row of linear elements associated with said control means and positioned adjacent said first transparent layer; and (b) a second row of linear elements associated with said control means and positioned orthogonally to said first row of linear elements and adjacent said second transparent layer, whereby said layer of optical medium may be altered, between said first state and said second state at any one or more of an array of locations where one element of said first row crosses one element of said second row, by the application of said control parameter between said one element of said first row and said one element of said second row;

(c) a third row of linear elements associated with said control means and positioned adjacent said third transparent layer; and (d) a fourth row of linear elements associated with said control means and positioned orthogonally to said third row of linear elements and adjacent said fourth transparent layer, whereby said layer of optical medium may be altered, between said first state and said third state at any one or more of an array of locations where one element of said third row crosses one element of said fourth row, by the application of said control parameter between said one element of said third row and said one element of said fourth row.

16. The apparatus of claim 15 wherein said control means comprises multiplexing means for selectively scanning said first, second, third and fourth rows with said applied control parameter, whereby each of said locations on said first array and on said second array may be selectively and sequentially stimulated by the application of said control parameter thereat.

17. The apparatus of claim 13 or claim 16 wherein said control means further comprises:

(a) second means for monitoring the line of sight of an eye of the subject and providing an output signal representative of said line of sight; and (b) computing means responsive to the output signal of said second means for computing a scanning sequence representative of said dynamic pattern, wherein said computed scanning sequence controls said multiplexing means to produce in said optical element said pattern.

18. The apparatus of claim 17 wherein said first area is a generally circular area centered at said point of intersection, said second area is a generally annular area bordering said first area, and said third area is a generally annular area bordering said second area, within the confines of said optical element.

19. The apparatus of claim 18 wherein said second area is scanned so as to produce a state of complete light scattering transmissivity and said third area is scanned so as to produce a state of complete opacity therein.

20. The apparatus of claim 19 wherein said second area further comprises:

(a) a first sub-area, bordering said first area, which is scanned so as to produce a state of partial light scattering transmissivity therein;

(b) a second sub-area, bordering said first sub-area, which is scanned so as to produce a state of complete light scattering light transmissivity therein; and wherein said third area further comprises:

(c) a first sub-area, bordering said second area, which is scanned so as to produce a state of partial opacity therein; and (d) a second sub-area, bordering said first sub-area, which is scanned so as to produce a state of complete opacity therein.

21. The apparatus of claim 20 wherein said partial light scattering transmissivity is produced by stimulating said locations to separately selectable levels of light scattering transmissivity and by selecting said locations so as to produce a variable spacial density of said locations so stimulated; and wherein said partial opacity is produced by stimulating said locations to separately selectable levels of opacity and by selecting said locations so as to produce a variable spacial density of said locations so stimulated.

22. The apparatus of claim 17 wherein said apparatus is intended for use in conjunction with a vehicle simulator operable by the subject, which provides simulator output signals representative of the vehicle acceleration forces which would be transmitted to the subject in the actual vehicle being simulated, and wherein said computing means further comprises means responsive to the simulator output signals for computing said scanning sequence such that said visual effects correspond to the visual effects the subject would perceive were he experiencing loss of vision due to the effect of the vehicle acceleration forces on him.

23. The apparatus of claim 9 wherein said optical element comprises a visor.

24. A method for simulating vision loss in a subject, comprising the steps of:

(a) providing an optical element variable between a first state of transparency and a second state of opacity, within the field of view of the subject;

(b) determining the point of intersection of said optical element and the line of sight of an eye of the subject;

(c) defining for said optical element according to a predetermined schedule, with respect to said point of intersection, a first area to be put in said first state, and which thereby defines a second area which comprises the remaining area of said element;

(d) defining in said second area, according to said predetermined schedule, a set of selected locations to be put in said second state; and (e) controlling said optical element to produce said first area and second area therein, whereby the field of view of the subject is altered according to said predetermined schedule to simulate for the subject the visual effects associated with vision loss.

25. The method of claim 24 wherein said optical element is further variable between said first and second states and a third state of light scattering transmissivity, wherein said method is further comprised of the following step to be performed between step (d) and step (e):

(f) defining for said optical element, according to said predetermined schedule, with respect to said point of intersection, a third area to be put in said third state, between said first area and said second area; and wherein step (e) further comprises the step of controlling said optical element to further produce said third area.

26. The method of claim 24 or 25 wherein said step of providing is performed by providing a layer of optical medium contained between a first and a second transparent layer, within the field of view of the subject.

27. The method of claim 26 wherein said step of providing is performed by providing a layer of liquid crystal between said first and said second transparent layers.

28. The method of claim 25 wherein said step of providing is performed by providing a first and a second layer of optical medium contained between a first and a second transparent layer, and said second and a third transparent layer, respectively, within the field of view of the subject.

* * * * *